(12) United States Patent
Andriolo et al.

(10) Patent No.: US 11,161,422 B2
(45) Date of Patent: Nov. 2, 2021

(54) WIRELESS CHARGING STATION, AUTOMATIC MOWER AND AUTOMATIC MOWING SYSTEM

(71) Applicant: Positec Power Tools (Suzhou) Co., Ltd, Suzhou (CN)

(72) Inventors: Paolo Andriolo, Vicenza (IT); Fangshi Liu, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 15/501,779

(22) PCT Filed: Aug. 7, 2015

(86) PCT No.: PCT/CN2015/086382
§ 371 (c)(1),
(2) Date: Feb. 3, 2017

(87) PCT Pub. No.: WO2016/019902
PCT Pub. Date: Feb. 11, 2016

(65) Prior Publication Data
US 2017/0215336 A1    Aug. 3, 2017

(30) Foreign Application Priority Data

Aug. 7, 2014    (CN) .......................... 201410386284.2
Aug. 7, 2014    (CN) .......................... 201410386662.7

(51) Int. Cl.
*A01D 34/00*    (2006.01)
*H02J 7/02*    (2016.01)
(Continued)

(52) U.S. Cl.
CPC .......... *B60L 53/126* (2019.02); *A01D 34/001* (2013.01); *A01D 34/008* (2013.01);
(Continued)

(58) Field of Classification Search
CPC ...... A01D 34/008; A01D 34/78; A01D 69/02; A01D 34/001; G05D 2201/0208;
(Continued)

(56) References Cited

U.S. PATENT DOCUMENTS 4,800,328 A * 1/1989 Bolger .................... B60L 5/005
                                                    191/10
6,525,509 B1    2/2003 Petersson et al.
(Continued)

FOREIGN PATENT DOCUMENTS

CN    102315691 A    1/2012
CN    102475015 A    5/2012
(Continued)

OTHER PUBLICATIONS

International Search Report from International Application No. PCT/CN2015/086382, dated Oct. 29, 2015, 8 pages, with English translation.
(Continued)

*Primary Examiner* — Alicia Torres
(74) *Attorney, Agent, or Firm* — TraskBritt

(57) ABSTRACT

A wireless charging station for charging an automatic mower including a cutting device, an energy storage unit, a wireless electric energy transmitter and a wireless electric energy receiver electrically connected with the energy storage unit. The wireless charging station is at least partially located in a movement range of the automatic mower, and the top of the wireless charging station is lower than the bottom of the cutting device. An automatic mower matching the wireless charging station and an automatic mowing system using the wireless charging station and the automatic mower is further provided. The wireless charging station, the automatic mower, and the automatic mowing system enable the automatic mower to trim a lawn closer to the charging station, (Continued)

reduce a cutting corner in a movable range of the automatic mower, and improve trimming capability of the automatic mower for the lawn.

14 Claims, 10 Drawing Sheets

(51) Int. Cl.
*B60L 53/126* (2019.01)
*B60L 53/34* (2019.01)
*A01D 101/00* (2006.01)

(52) U.S. Cl.
CPC .............. *B60L 53/34* (2019.02); *H02J 7/025* (2013.01); *A01D 2101/00* (2013.01)

(58) Field of Classification Search
CPC . G05D 1/0225; B60L 11/1809; B60L 11/182; B60L 11/1824; B60L 53/126; H02J 7/025
USPC .................................................. 320/108, 109
See application file for complete search history.

(56) References Cited

U.S. PATENT DOCUMENTS

| | | | |
|---|---|---|---|
| 7,185,478 B1* | 3/2007 | Willis, II | A01D 34/008 56/10.2 A |
| 7,668,631 B2 | 2/2010 | Bernini | |
| 10,139,238 B2* | 11/2018 | Widmer | G01C 21/36 |
| 2002/0156556 A1* | 10/2002 | Ruffner | A01D 34/008 701/23 |
| 2008/0282658 A1* | 11/2008 | Bernini | A01D 34/008 56/10.2 E |
| 2009/0183478 A1* | 7/2009 | Bernini | A01B 69/008 56/10.2 A |
| 2009/0315511 A1* | 12/2009 | Lai | B25J 19/005 320/107 |
| 2010/0225271 A1* | 9/2010 | Oyobe | B60L 5/005 320/108 |
| 2012/0260617 A1* | 10/2012 | Gilpatrick | A01D 34/001 56/11.9 |
| 2012/0265391 A1* | 10/2012 | Letsky | A01D 34/008 701/25 |
| 2013/0333342 A1 | 12/2013 | Keski-Luopa et al. | |
| 2015/0077045 A1 | 3/2015 | Harris | |
| 2015/0328775 A1* | 11/2015 | Shamlian | B25J 9/1676 700/258 |

FOREIGN PATENT DOCUMENTS

| | | |
|---|---|---|
| CN | 102934565 A | 2/2013 |
| CN | 103107576 A | 5/2013 |
| CN | 103217898 A | 7/2013 |
| CN | 103336268 A | 10/2013 |
| EP | 0965261 A1 | 12/1999 |
| EP | 3069593 A1 | 9/2016 |
| GB | 2308049 B | 11/1997 |

OTHER PUBLICATIONS

International Written Opinion from International Application No. PCT/CN2015/086382, dated Oct. 29, 2015, 5 pages.
European Search Report from European Application No. 15830628.2, dated Mar. 1, 2018, 7 pages.
Chinese Second Office Action for CN Application No. 201510482750.1 dated Sep. 5, 2017, 15 pages.
Chinese Second Office Action for CN Application No. 201510482747.X dated Sep. 30, 2017, 20 pages.
Chinese First Search for CN Application No. 201510482750.1 dated Dec. 27, 2016, 2 pages.
Chinese First Search for CN Application No. 201510482747.X dated Jan. 22, 2017, 2 pages.
Chinese First Office Action for CN Application No. 201510482750.1 dated Jan. 4, 2017, 13 pages.
Chinese First Office Action for CN Application No. 201510482747.X dated Feb. 4, 2017, 16 pages.
European Communication pursuant to Article 94(3) EPC for European Application No. 15830628.2, dated Dec. 20, 2018, 5 pages.
European Search Report and Written Opinion for European Application No. 19208731.0, dated Mar. 30, 2020, 3 pages.
European Communication Pursuant to Article 94(3) EPC, for European Application No. 19208731.0, dated Feb. 4, 2021, 5 pages.

* cited by examiner

WIRELESS CHARGING STATION, AUTOMATIC MOWER AND AUTOMATIC MOWING SYSTEM

CROSS-REFERENCE TO RELATED APPLICATIONS

This application is a national phase entry under 35 U.S.C. § 371 of International Patent Application PCT/CN2015/086382, filed Aug. 7, 2015, designating the United States of America and published as International Patent Publication WO 2016/019902 A1 on Feb. 11, 2016, which claims the benefit under Article 8 of the Patent Cooperation Treaty to Chinese Patent Application Serial Nos. 201410386284.2 and 201410386662.7, both filed Aug. 7, 2014.

TECHNICAL FIELD

The present invention relates to the field of gardening equipment, and in particular, to a wireless charging station, an automatic mower matched with the wireless charging station, and an automatic mowing system using the wireless charging station and the automatic mower.

BACKGROUND

The existing automatic mower generally includes an enclosure, a mobile device, a cutting device, and a battery pack, and the battery can provide electric energy required by operation of the mobile device and the cutting device. In use, a to-be-cut region for the automatic mower to move is preset on a lawn, a charging station is disposed in the to-be-cut region, when it is detected that the power of the battery pack is low, the automatic mower can automatically return to the charging station and connect a charging terminal in the charging station, to achieve charging of the battery pack, and after it is subsequently detected that the power in the battery pack meets the operation demand, the automatic mower would automatically drive away from the charging station, to continue to complete trimming of the lawn in the to-be-cut region.

The existing charging station generally also has a base board for the automatic mower to stay during charging and a baffle for stopping the automatic mower from driving away from the base board, and when the automatic mower returns to the charging station for charging, it first drives on the base board and connects the charging terminal on the baffle, and completely stops moving under the blocking of the baffle, causing the charging of the battery pack to be more stable. However, the automatic mower, in the process of moving to trim the lawn, may automatically stay away to prevent damage to the mower after contacting the baffle, resulting in that the lawn on the periphery of the baffle cannot be trimmed, and in order to ensure that the baffle can stably stop movement of the automatic mower when the automatic mower charges, the baffle generally is higher and wider than the automatic mower, so that the to-be-cut region always has a large-sized cutting blind corner, thereby diminishing a user's experience.

Therefore, it is necessary to propose a new charging station to solve the above problems. Correspondingly, it is also necessary to provide a new automatic mower and an automatic mowing system having the charging station and the automatic mower, to jointly solve the above technical problems.

BRIEF SUMMARY

The present invention provides a wireless charging station having no interference with the cutting work of an automatic mower.

In order to achieve the above invention purpose, the present invention provides a wireless charging station, for charging an automatic mower, the automatic mower comprising a cutting device, an energy storage unit and a wireless electric energy receiver, the wireless electric energy receiver being electrically connected with the energy storage unit, the wireless charging station comprises a wireless electric energy transmitter, the wireless charging station is at least partially located in a movement range of the automatic mower, and the top of the wireless charging station is lower than the bottom of the cutting device.

In order to achieve the above invention purpose, the present invention also provides a wireless charging station, for charging an automatic mower, the automatic mower comprising a cutting device, an energy storage unit and a wireless electric energy receiver, the wireless electric energy receiver being electrically connected with the energy storage unit, the wireless charging station comprises a wireless electric energy transmitter, the wireless charging station is at least partially located in a movement range of the automatic mower, and the top of the wireless electric energy transmitter is lower than the bottom of the cutting device.

In order to achieve the above invention purpose, the present invention also provides a wireless charging station, for charging an automatic mower, the automatic mower comprising a cutting device, an energy storage unit and a wireless electric energy receiver, the wireless electric energy receiver being electrically connected with the energy storage unit, the wireless charging station comprises a wireless electric energy transmitter, the wireless charging station is at least partially located in a movement range of the automatic mower, and the height of the wireless charging station above the ground is less than the minimum distance between the cutting device and the ground.

Preferably, the height of the wireless charging station above the ground is less than or equal to 150 mm.

Preferably, the height of the wireless charging station above the ground is less than or equal to 60 mm.

Preferably, the height of the wireless charging station above the ground is less than or equal to 20 mm.

Preferably, the wireless charging station is completely located in the movement range of the automatic mower.

In order to achieve the above invention purpose, the present invention also provides a wireless charging station, for charging an automatic mower, the automatic mower comprising a cutting device, an energy storage unit and a wireless electric energy receiver, the wireless electric energy receiver being electrically connected to the energy storage unit, the wireless charging station comprises a wireless electric energy transmitter, the wireless charging station is at least partially located in a movement range of the automatic mower, and the wireless electric energy transmitter is located below the ground.

In order to achieve the above invention purpose, the present invention also provides a wireless charging station, for charging an automatic mower, the automatic mower comprising a cutting device, an energy storage unit and a wireless electric energy receiver, the wireless electric energy receiver being electrically connected with the energy storage unit, the wireless charging station comprises a wireless electric energy transmitter, the wireless charging station is at least partially located in a movement range of the automatic mower, and the wireless charging station is located below the ground.

Preferably, the wireless charging station is completely located in the movement range of the automatic mower.

The present invention provides an automatic mowing system, comprising a wireless charging station having no interference with the cutting work of an automatic mower.

In order to achieve the above invention purpose, the present invention provides an automatic mowing system, the automatic mowing system comprises: an automatic mower comprising: an enclosure; a mobile device comprising a mobile mechanism that supports the enclosure and drives the enclosure to move; a cutting device comprising a cutter located below the enclosure; an energy storage unit received in the enclosure and used for providing power for the mobile device and the cutting device; and a wireless electric energy receiver disposed on the enclosure and electrically connected with the energy storage unit; and the wireless charging station as mentioned before, the wireless electric energy transmitter in the wireless charging station selectively matches the wireless electric energy receiver to charge the energy storage unit.

In order to achieve the above invention purpose, the present invention also provides an automatic mowing system, the automatic mowing system comprises: an automatic mower comprising: an enclosure; a cutting device received in the enclosure, comprising a connection tray; an energy storage unit providing power for the cutting device; a wireless electric energy receiver electrically connected with the energy storage unit; and the wireless charging station as mentioned before, the wireless electric energy transmitter in the wireless charging station selectively matches the wireless electric energy receiver to charge the energy storage unit.

Preferably, the wireless electric energy receiver is disposed above the connection tray.

Preferably, the wireless electric energy receiver is disposed in the connection tray.

Preferably, the size of the wireless electric energy receiver along the width direction of the automatic mower is less than or equal to 50 cm.

Preferably, the automatic mower further comprises a boundary sensor, the boundary sensor receives a signal representing a boundary of a to-be-cut region and identifies a position of the automatic mower relative to the boundary of the to-be-cut region, and the wireless electric energy receiver is separated from the boundary sensor.

Preferably, the boundary sensor and the wireless electric energy receiver are disposed at a front portion and a rear portion along a travel direction of the automatic mower, respectively.

Preferably, one of the boundary sensor and the wireless electric energy receiver is disposed above the connection tray, and the other one of the boundary sensor and the wireless electric energy receiver is disposed below the connection tray.

In order to achieve the above invention purpose, the present invention also provides an a wireless charging station, for charging an automatic mower, the automatic mower comprising a cutting device, the wireless charging station comprises a wireless electric energy transmitter, the wireless charging station is at least partially located in a movement range of the automatic mower, and the height of the wireless charging station above the ground is less than the minimum distance between the cutting device and the ground.

Preferably, the height of the wireless charging station above the ground is less than or equal to 150 mm.

Preferably, the height of the wireless charging station above the ground is less than or equal to 60 mm.

Preferably, the height of the wireless charging station above the ground is less than or equal to 20 mm.

Preferably, the wireless charging station is completely located below the ground.

Preferably, the wireless charging station is completely located in the to-be-cut region.

In order to achieve the above invention purpose, the present invention also provides an automatic mowing system, the automatic mowing system comprises: an automatic mower comprising: an enclosure; a mobile device comprising a mobile mechanism that supports the enclosure and drives the enclosure to move; a cutting device comprising a cutter located below the enclosure; an battery pack received in the enclosure and used for providing power for the mobile device and the cutting device; and a wireless electric energy receiver disposed on the enclosure and electrically connected with the battery pack; and the wireless charging station as mentioned before, the wireless electric energy transmitter in the wireless charging station selectively matches the wireless electric energy receiver to charge the battery pack.

Compared with the prior art, in the present invention, the height of the wireless charging station relative to the ground is lower than the height of the cutter relative to the ground, enabling the cutter to process the area near the wireless charging station, thus improving the mowing range of the automatic mower to lawn.

The present invention provides an automatic mowing system, comprising a wireless charging station reducing interference with the cutting work of an automatic mower.

In order to achieve the above invention purpose, the present invention provides an automatic mowing system, the automatic mowing system comprises: an automatic mower comprising: an enclosure; a cutting device received in the enclosure, comprising a connection tray; an energy storage unit providing power for the cutting device; a wireless electric energy receiver electrically connected with the energy storage unit; and a wireless charging station comprising: a wireless electric energy transmitter selectively matching the wireless electric energy receiver to charge the energy storage unit; the wireless charging station being at least partially located in a movement range of the automatic mower, the enclosure comprising a lengthwise direction, and the automatic mower being movable to: the enclosure and the wireless charging station at least partially overlap in the lengthwise direction.

In order to achieve the above invention purpose, the present invention also provides an automatic mowing system, the automatic mowing system comprises: an automatic mower comprising: an enclosure; a cutting device received in the enclosure, comprising a connection tray; an energy storage unit providing power for the cutting device; a wireless electric energy receiver electrically connected with the energy storage unit; and a wireless charging station comprising: a wireless electric energy transmitter selectively matching the wireless electric energy receiver to charge the energy storage unit; the wireless charging station being at least partially located in a movement range of the automatic mower, the automatic mower being movable to a specific position, and in the specific position, projections of the enclosure and the wireless charging station at least partially overlap in a vertical direction.

In order to achieve the above invention purpose, the present invention also provides an automatic mowing system, the automatic mowing system comprises: an automatic mower comprising: an enclosure; a cutting device received in the enclosure, comprising a connection tray; an energy storage unit providing power for the cutting device; a wireless electric energy receiver disposed on the enclosure and electrically connected with the energy storage unit; and a wireless charging station comprising: a wireless electric energy transmitter selectively matching the wireless electric energy receiver to charge the energy storage unit; the wireless charging station being at least partially located in a movement range of the automatic mower, the automatic mower being movable to a specific position, and in the specific position, projections of the enclosure and the wireless charging station at least partially overlap in a horizontal direction.

Preferably, the wireless charging station is completely located below the ground.

Preferably, the height of the wireless charging station located above the ground is less than the minimum distance between the cutting device and the ground.

Preferably, the minimum distance between the cutting device and the ground is 150 mm or 60 mm or 20 mm.

Preferably, the height of the wireless charging station located above the ground is greater than the minimum distance between the cutting device and the ground.

Preferably, the automatic mower comprises a guide notch extending from an edge of the enclosure into the enclosure, and the automatic mower is movable to: the wireless charging station is at least partially located in the guide notch.

Preferably, the enclosure comprises a head and a tail opposite each other, and the guide notch extends from an edge of the head into the enclosure along the lengthwise direction.

Preferably, the enclosure comprises a top and a bottom opposite each other, and the guide notch is located at the bottom and extends toward the top.

Preferably, the guide notch extends from the bottom to the top, and causes the bottom and the top to connect.

Preferably, the wireless electric energy receiver is located in the guide notch.

Preferably, the automatic mowing system comprises a regulating mechanism connecting the wireless electric energy receiver and/or the wireless electric energy transmitter, and when the automatic mower moves to that, the enclosure at least partially overlaps with the wireless charging station in the lengthwise direction and stops moving, and the regulating mechanism selectively regulates a relative distance between the wireless electric energy receiver and the wireless electric energy transmitter.

Preferably, the wireless electric energy receiver is disposed above the connection tray.

Preferably, the wireless electric energy receiver is disposed in the connection tray.

Preferably, the size of the wireless electric energy receiver along the width direction of the automatic mower is less than or equal to 50 cm.

Preferably, the automatic mower further comprises a boundary sensor, the boundary sensor receives a signal representing a boundary of a to-be-cut region and identifies the position of the automatic mower relative to the boundary of the to-be-cut region, and the wireless electric energy receiver is separated from the boundary sensor.

Preferably, the boundary sensor and the wireless electric energy receiver are disposed at a front portion and a rear portion along a travel direction of the automatic mower, respectively.

Preferably, one of the boundary sensor and the wireless electric energy receiver is disposed above the connection tray, and the other one of the boundary sensor and the wireless electric energy receiver is disposed below the connection tray.

In order to achieve the above invention purpose, the present invention also provides an automatic mowing system, the automatic mowing system comprises: an automatic mower comprising: an enclosure; a mobile device comprising a mobile mechanism that supports the enclosure and drives the enclosure to move; a cutting device comprising a cutter located below the enclosure; an battery pack received in the enclosure and used for providing power for the mobile device and the cutting device; a wireless electric energy receiver disposed on the enclosure and electrically connected with the battery pack; and a wireless charging station comprising: a wireless electric energy transmitter selectively matching the wireless electric energy receiver to charge the battery pack; the wireless charging station being at least partially located in a movement range of the automatic mower, the enclosure comprising a lengthwise direction, and the automatic mower being movable to: the enclosure and the wireless charging station at least partially overlap in the lengthwise direction.

Preferably, the wireless charging station is completely located below the ground.

Preferably, the height of the wireless charging station located above the ground is less than the minimum distance between the cutting device and the ground.

Preferably, the minimum distance between the cutting device and the ground is 150 mm or 60 mm or 20 mm.

Preferably, the height of the wireless charging station located above the ground is greater than the minimum distance between the cutting device and the ground.

Preferably, the automatic mower comprises a guide notch extending from an edge of the enclosure into the enclosure, and the automatic mower is movable to: the wireless charging station is at least partially located in the guide notch.

Preferably, the enclosure comprises a head and a tail opposite each other, and the guide notch extends from an edge of the head into the enclosure along the lengthwise direction.

Preferably, the enclosure comprises a top and a bottom opposite each other, and the guide notch is located at the bottom and extends toward the top.

Preferably, the guide notch extends from the bottom to the top, and causes the bottom and the top to connect.

Preferably, the wireless electric energy receiver is located in the guide notch.

Preferably, the automatic mowing system comprises a regulating mechanism connecting the wireless electric energy receiver and/or the wireless electric energy transmitter, and when the automatic mower moves to that the enclosure at least partially overlaps with the wireless charging station in the lengthwise direction and stops moving, and the regulating mechanism selectively regulates a relative distance between the wireless electric energy receiver and the wireless electric energy transmitter.

Compared with the prior art, the automatic mower of the automatic mowing system in the present invention, can mow the lawn closer to the charging station, reducing or even completely eliminating the cutting blind corner in the movement range, thus improving the ability of the automatic mower to mow the lawn.

The present invention provides an automatic mower, comprising a wireless electric energy receiver having an optimized setting position.

In order to achieve the above invention purpose, the present invention provides an automatic mower, the automatic mower comprises an enclosure, a cutting device received in the enclosure and comprising a connection tray, an energy storage unit providing power for the cutting device, and a wireless electric energy receiver selectively acquiring wireless charging energy to charge the energy storage unit, and the wireless electric energy receiver is disposed above the connection tray.

In order to achieve the above invention purpose, the present invention also provides an automatic mower, the automatic mower comprises an enclosure, a cutting device received in the enclosure and comprising a connection tray, an energy storage unit providing power for the cutting device, and a wireless electric energy receiver selectively acquiring wireless charging energy to charge the energy storage unit, and the wireless electric energy receiver is disposed in the connection tray.

Preferably, the size of the wireless electric energy receiver along the width direction of the automatic mower is less than or equal to 50 cm.

Preferably, the automatic mower further comprises a boundary sensor, the boundary sensor receives a signal representing a boundary of a to-be-cut region and identifies the position of the automatic mower relative to the boundary of the to-be-cut region, and the wireless electric energy receiver is separated from the boundary sensor.

Preferably, the boundary sensor and the wireless electric energy receiver are disposed at a front portion and a rear portion along a travel direction of the automatic mower, respectively.

Preferably, one of the boundary sensor and the wireless electric energy receiver is disposed above the connection tray, and the other one of the boundary sensor and the wireless electric energy receiver is disposed below the connection tray.

The present invention further provides an automatic mowing system, the automatic mowing system comprising an automatic mower, the automatic mower comprising a wireless electric energy receiver having an optimized setting position.

In order to achieve the above invention purpose, the present invention provides an automatic mowing system, the automatic mowing system comprising a wireless charging station and an automatic mower, the wireless charging station comprising a wireless electric energy transmitter, the automatic mower is the automatic mower as mentioned before, and the wireless electric energy receiver selectively matches the wireless electric energy transmitter to acquire wireless charging energy.

Preferably, the top of the wireless charging station is lower than the bottom of the cutting device.

Preferably, the height of the wireless charging station located above the ground is less than the minimum distance between the cutting device and the ground.

Preferably, the wireless charging device is located below the ground.

Preferably, the enclosure comprises a lengthwise direction, and the automatic mower is movable to: the enclosure and the wireless charging station at least partially overlap in the lengthwise direction.

Preferably, the automatic mower is movable to a specific position, and in the specific position, projections of the enclosure and the wireless charging station at least partially overlap in a vertical direction.

Preferably, the automatic mower is movable to a specific position, and in the specific position, projections of the enclosure and the wireless charging station at least partially overlap in a horizontal direction.

In order to achieve the above invention purpose, the present invention also provides an automatic mower, the automatic mower comprises an enclosure, a cutting device received in the enclosure and comprising a connection tray, an energy storage unit providing power for the cutting device, a wireless electric energy receiver selectively acquiring wireless charging energy to charge the energy storage unit, and a boundary sensor, the boundary sensor receives a signal representing a boundary of a to-be-cut region and identifies the position of the automatic mower relative to the boundary of the to-be-cut region, and the wireless electric energy receiver is separated from the boundary sensor.

Preferably, the boundary sensor and the wireless electric energy receiver are disposed at a front portion and a rear portion along a travel direction of the automatic mower, respectively.

Preferably, one of the boundary sensor and the wireless electric energy receiver is disposed above the connection tray, and the other one of the boundary sensor and the wireless electric energy receiver is disposed below the connection tray.

Preferably, the size of the wireless electric energy receiver along the width direction of the automatic mower is less than or equal to 50 cm.

Preferably, the wireless electric energy receiver is disposed above the connection tray.

Preferably, the wireless electric energy receiver is disposed in the connection tray.

In order to achieve the above invention purpose, the present invention also provides an automatic mowing system, the automatic mowing system comprising a wireless charging station and an automatic mower, the wireless charging station comprising a wireless electric energy transmitter, the automatic mower is the automatic mower as mentioned before, and the wireless electric energy receiver selectively matches the wireless electric energy transmitter to acquire wireless charging energy.

Preferably, the top of the wireless charging station is lower than the bottom of the cutting device.

Preferably, the height of the wireless charging station located above the ground is less than the minimum distance between the cutting device and the ground.

Preferably, the wireless charging station is located below the ground.

Preferably, the enclosure comprises a lengthwise direction, and the automatic mower is movable to: the enclosure and the wireless charging station at least partially overlap in the lengthwise direction.

Preferably, the automatic mower is movable to a specific position, and in the specific position, projections of the enclosure and the wireless charging station at least partially overlap in a vertical direction.

Preferably, the automatic mower is movable to a specific position, and in the specific position, projections of the enclosure and the wireless charging station at least partially overlap in a horizontal direction.

Compared with the prior art, the position of the wireless electric energy receiver of the automatic mower provided in the present invention is set reasonably, making full use of the space inside the automatic mower, optimizing the structure of the automatic mower.

The present invention provides an automatic mower, comprising a wireless electric energy receiver with an optimized size.

In order to achieve the above invention purpose, the present invention provides an automatic mower, the automatic mower comprises an enclosure, a cutting device received in the enclosure and comprising a connection tray, an energy storage unit providing power for the cutting device, and a wireless electric energy receiver selectively acquiring wireless charging energy to charge the energy storage unit, and the size of the wireless electric energy receiver along the width direction of the automatic mower is less than or equal to 50 cm.

Preferably, the wireless electric energy receiver is disposed above the connection tray.

Preferably, the wireless electric energy receiver is disposed in the connection tray.

Preferably, the automatic mower further comprises a boundary signal sensor, the boundary signal sensor receives a signal representing a boundary of a to-be-cut region and identifies the position of the automatic mower relative to the boundary of the to-be-cut region, and the wireless electric energy receiver is separated from the boundary signal sensor.

Preferably, the boundary signal sensor and the wireless electric energy receiver are disposed at a front portion and a rear portion along a travel direction of the automatic mower, respectively.

Preferably, the boundary signal sensor and the wireless electric energy receiver is disposed above the connection tray, and the other one of the boundary signal sensor and the wireless electric energy receiver is disposed below the connection tray.

The present invention further provides an automatic mowing system, the automatic mowing system comprising an automatic mower, the automatic mower comprising a wireless electric energy receiver with an optimized size.

In order to achieve the above invention purpose, the present invention provides an automatic mowing system, the automatic mowing system comprising a wireless charging station and an automatic mower, the wireless charging station comprising a wireless electric energy transmitter, the automatic mower is the automatic mower as mentioned before, and the wireless electric energy receiver selectively matches the wireless electric energy transmitter to acquire wireless charging energy.

Preferably, the top of the wireless charging station is lower than the bottom of the cutting device.

Preferably, the height of the wireless charging station located above the ground is less than the minimum distance between the cutting device and the ground.

Preferably, the wireless charging station is located below the ground.

Preferably, the enclosure comprises a lengthwise direction, and the automatic mower is movable to: the enclosure and the wireless charging station at least partially overlap in the lengthwise direction.

Preferably, the automatic mower is movable to a specific position, and in the specific position, projections of the enclosure and the wireless charging station at least partially overlap in a vertical direction.

Preferably, the automatic mower is movable to a specific position, and in the specific position, projections of the enclosure and the wireless charging station at least partially overlap in a horizontal direction.

Compared with the prior art, the size of the wireless electric energy receiver of the automatic mower provided in the present invention along the width direction of the automatic mower is less than or equal to 50 cm, enabling the wireless electric energy receiver to be completely received in the enclosure of the automatic mower, thus optimizing the structure of the automatic mower.

BRIEF DESCRIPTION OF THE DRAWINGS

The objectives, technical solutions, and beneficial effects of the present invention can be clearly obtained through the following detailed description of specific embodiments that can implement the present invention and in combination with the accompanying drawings.

Corresponding numbers of related elements in the drawings are as follows.

Automatic mowing system, 100a, 100b, 100c, 100d, 100e, 100f, 100g, 100h, 100i;
Automatic mower, 10a, 10b, 10c, 10d, 10e, 10f, 10g, 10h, 10i;
Enclosure, 11a, 11b, 11c, 11d, 11e, 11f, 11g, 11h, 11i;
Head, 111a, 111c, 111d, 111f, 111g, 111h, 111i;
Tail, 112a, 112c, 112d, 112f, 112g, 112h, 112i;
Top, 113a, 113c, 113d, 113f, 113g, 113h, 113i;
Bottom, 114a, 114c, 114d, 114f, 114g, 114h, 114i;
Receiving chamber, 115a, 115f, 115g, 115h, 115i;
Guide notch, 116c, 116d;
Edge, 117c, 117d;
Mobile device 12a, 12f, 12g, 12h, 12i;
Mobile mechanism 121a, 121b, 121c, 121d, 121e, 121f, 121g, 121h, 121i;
Mobile motor, 122a, 122f, 122g, 122h, 122i;
Cutting device, 13a, 13f, 13g, 13h, 13i;
Cutter, 131a, 131b, 131c, 131d;
Connection tray, 131f, 131g, 131h, 131i;
Cutting motor, 132a, 132f, 132g, 132h, 132i;
Battery pack, 14a;
Energy storage unit, 14f, 14g, 14h, 14i;
Wireless electric energy receiver, 15a, 15b, 15c, 15d, 15e, 15f, 15g, 15h, 15i;
Mounting portion 16a;
Control circuit, 17a, 17f, 17g, 17h, 17i;
Regulating mechanism, 18a, 18f;

Boundary sensor, 19h, 19i;
Wireless charging station, 20a, 20b, 20c, 20d, 20e, 20f, 20g, 20h, 20i;
Wireless electric energy transmitter, 21a, 21b, 21c, 21d, 21e, 21f, 21g, 21h, 21i;
To-be-cut region, 30; and
Lengthwise direction, T.

DETAILED DESCRIPTION

The present invention is described below in detail in combination with specific embodiments illustrated. However, the embodiments do not limit the present invention, and changes in the structure, method or function made by those of ordinary skill in the art according to the embodiment are all included in the scope of the present invention.

Figure 1:
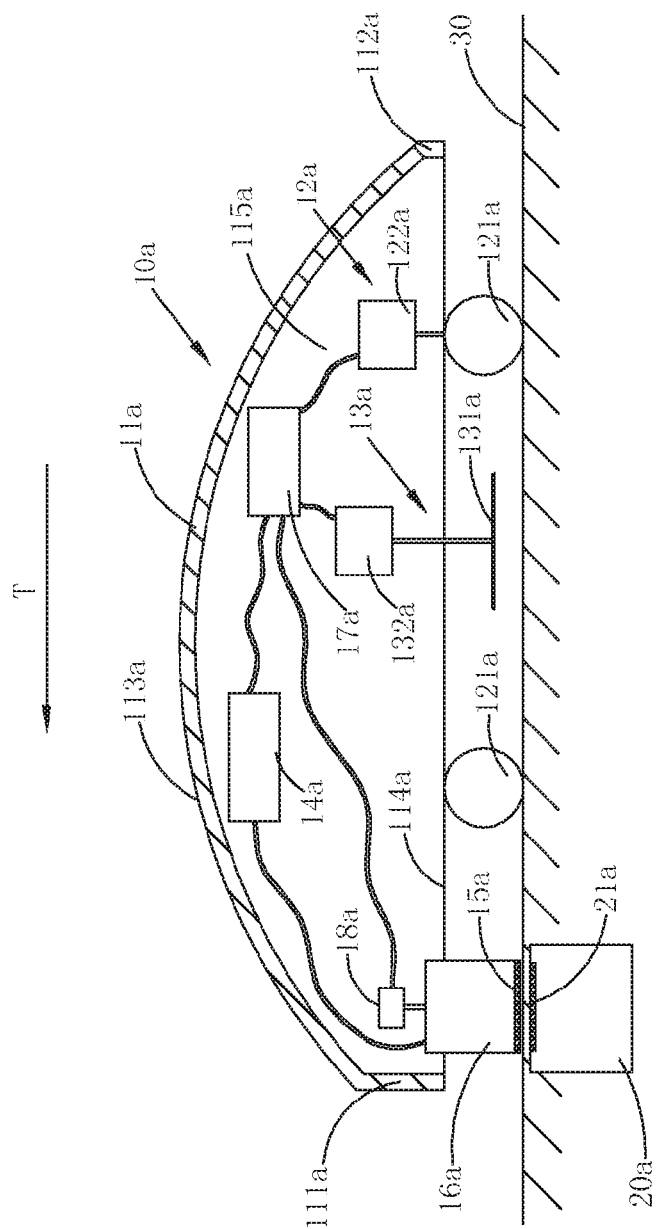
FIG. 1 is a sectional view of an automatic mowing system in a first embodiment of the present invention.

Referring to FIG. 1, in a first embodiment of the present invention, the automatic mowing system 100a includes an automatic mower 10a and a wireless charging station 20a cooperating therewith, the automatic mower 10a and the wireless charging station 20a are both located in a to-be-cut region 30, and the to-be-cut region 30 is a lawn to be processed by a user. The wireless charging station 20a may also be located in another region outside the to-be-cut region 30. That is to say, it is okay as long as the wireless charging station 20a is in a movement range accessible to the automatic mower 10a.

The automatic mower 10a includes an enclosure 11a, a mobile device 12a, a cutting device 13a, a battery pack 14a, and a wireless electric energy receiver 15a; the battery pack 14a is fixed into the enclosure 11a and electrically connected with the mobile device 12a and the cutting device 13a, to provide power required by operation of the mobile device 12a and the cutting device 13a; the battery pack 14a is electrically connected with the wireless electric energy receiver 15a, to acquire charging power from the wireless electric energy receiver 15a.

The enclosure 11a includes a head 111a and a tail 112a as well as a top 113a and a bottom 114a connected between the head 111a and the tail 112a and opposite each other, a receiving chamber 115a is formed between the top 113a and the bottom 114a, and the battery pack 14a is removably disposed in the receiving chamber 115a.

The mobile device 12a includes a mobile mechanism 121a and a mobile motor 122a that drives the mobile mechanism 121a to operate; in this embodiment, the mobile mechanism 121a includes multiple rollers which are rotatably disposed below the bottom 114a to support the whole enclosure 11a, and the mobile motor 122a is fixed into the receiving chamber 115a and electrically connected with the battery pack 14a; after acquiring the output power of the battery pack, the mobile motor 122a drives the rollers to roll and then drives the enclosure 11a to move in the to-be-cut region 30.

Certainly, in other embodiments of the present invention, the rollers may also be disposed on two sides of the enclosure 11a, the mobile mechanism 121a may also use other conventional mobile mechanisms such as a track mechanism, and it is only necessary to maintain that the mobile mechanism 121a can stably support and drive the enclosure 11a to move, which is not repeated herein.

In this embodiment, the enclosure 11a has a lengthwise direction T from the tail 112a to the head 111a, the mobile device 12a drives the automatic mower 10a to make conventional movement, and the direction of the conventional movement is the same as that of the lengthwise direction T.

The mobile device 12a further includes a steering module (not shown) and a reversing module (not shown) that controls the automatic mower 10a to adjust the movement direction to perform an obstacle avoiding operation, the steering module and the reversing module match the mobile mechanism 121a, regulate the mobile mechanism 121a when there is an obstacle ahead or it is necessary to change to advance toward the target, and then drive the mobile mechanism 121a to steer or reverse through the mobile motor 122a, thus achieving free movement of the automatic mower 10a in the to-be-cut region 30.

It should be noted that the "lengthwise direction" herein is not limited to the lengthwise direction T from the tail 112a to the head 111a described previously, which may also be a direction opposite to the lengthwise direction T and from the head 111a to the tail 112a, which is a technology well known to those of ordinary skill in the art and is not repeated herein.

The cutting device 13a includes a cutter 131a and a cutting motor 132a that drives the cutter 131a to rotate, the cutting motor 132a is fixed into the receiving chamber 115a and electrically connected with the battery pack 14a, and an output shaft of the cutting motor 132a extends and penetrates the bottom 114a, so that the cutter 131a is located below the enclosure 11a; the cutting motor 132a, after acquiring the power output by the battery pack 14a, drives the cutter 131a to rotate, which automatically trims the to-be-cut region 30 while achieving free movement of the automatic mower 10a on the to-be-cut region 30.

The automatic mower 10a further includes a mounting portion 16a connected onto the enclosure 11a, the wireless electric energy receiver 15a uses a magnetic induction coil, which is mounted in the mounting portion 16a and close to an outer surface of the mounting portion 16a, and the wireless electric energy receiver 15a is disposed on the enclosure 11a through the mounting portion 16a, to jointly move with the automatic mower 10a.

In this embodiment, the automatic mower 10a further includes a control circuit 17a, the mobile motor 122a and the cutting motor 132a are both connected to the battery pack 14a through the control circuit 17a, and the power output by the battery pack 14a to the mobile motor 122a and the cutting motor 132a is adjusted through the control circuit 17a, to drive and shut down the cutting motor 132a and the mobile motor 122a according to different working conditions, causing movement and cutting of the automatic mower 10a to be more intelligent; even the control circuit 17a may further connect the wireless electric energy receiver 15a and the battery pack 14a, and then regulate a charging current for the battery pack 14a, preventing overcharge of the battery pack 14a, which is not repeated herein.

Certainly, the control circuit 17a includes a switch module, a battery pack undervoltage and overcurrent protection module, a load current detection module, a motor speed control module, an obstacle impact identification module and other common functional modules, which is a technology well known to those of ordinary skill in the art and is not repeated herein.

The wireless charging station 20a includes a wireless electric energy transmitter 21a that acquires an AC signal from an external power source (not shown); the wireless electric energy transmitter 21a also uses a magnetic induction coil, and when the wireless electric energy transmitter 21a and the wireless electric energy receiver 15a are aligned, power output by the external power source can be transferred to the wireless electric energy receiver 15a through energy transfer such as electromagnetic induction and magnetic resonance through the two magnetic induction coils of the wireless electric energy transmitter 21a and the wireless electric energy receiver 15a, to complete charging for the battery pack 14a, which is a technology well known to those of ordinary skill in the art and is not repeated herein.

In this embodiment, the height of the wireless charging station 20a located above the ground is 0. The wireless charging station 20a is completely located below the ground, and the wireless charging station 20a is completely located in the to-be-cut region 30.

As the wireless charging station 20a is completely located below the ground of the to-be-cut region 30, whether the automatic mower 10a randomly gets close to the wireless charging station 20a or intentionally directly returns to the wireless charging station 20a for charging in the process of moving in the to-be-cut region 30, the automatic mower 10a always can freely pass through or stay above the wireless charging station 20a, and the cutter 131a would not impact the wireless charging station 20a; so that the automatic mower 10a is movable to: the enclosure 11a can completely overlap with the wireless charging station 20a in the lengthwise direction T of the enclosure 11a, achieving that the to-be-cut region 30 has no cutting blind corner, and ensuring integrity and beauty of the lawn on the to-be-cut region 30.

Certainly, in other embodiments of the present invention, the wireless charging station 20a may also be merely partially located in the to-be-cut region 30, that is, the wireless charging station 20a may be disposed across a boundary line of the to-be-cut region 30, which does not affect wireless charging for the automatic mower 10a and is not repeated herein.

In this embodiment, the wireless electric energy receiver 15a is close to the head 111a of the automatic mower 10a, so that, when the automatic mower 10a returns to the wireless charging station 20a, the wireless electric energy receiver 15a and the wireless electric energy transmitter 21a can be aligned and matched faster, improving the charging efficiency of the automatic mower 10a.

Certainly, in other embodiments of the present invention, the wireless electric energy receiver 15a may also be close to the tail 112a of the automatic mower 10a or other positions, as long as it avoids that the mounting portion 16a interferes with rotation of the cutter 131a, which is not repeated herein. In this embodiment, the automatic mowing system 100a further includes a regulating mechanism 18a which is connected between the wireless electric energy receiver 15a and the enclosure 11a; specifically, the regulating mechanism 18a is fixed onto the enclosure 11a and connected with the mounting portion 16a, and the regulating mechanism 18a can drive the mounting portion 16a to move relative to the enclosure 11a, to achieve regulation on the position of the wireless electric energy receiver 15a relative to the enclosure 11a.

Preferably, the regulating mechanism 18a is electrically connected with the control circuit 17a; after the automatic mower 10a returns to the wireless charging station 20a and completes matching between the wireless electric energy receiver 15a and the wireless electric energy transmitter 21a, the regulating mechanism 18a can drive the wireless electric energy receiver 15a to move along a vertical direction toward the wireless electric energy transmitter 21a; as in this embodiment, the wireless charging station 20a is completely located below the ground, when the wireless electric energy receiver 15a clings to the ground, the wireless electric energy receiver 15a and the wireless electric energy transmitter 21a are closest, to ensure the efficiency of wireless charging.

After charging for the battery pack 14a is completed, the regulating mechanism 18a drives the wireless electric energy receiver 15a to move upwards away from the ground and return to a position before a move-down operation, to enable the automatic mower 10a to smoothly leave from above the wireless charging station 20a subsequently, without being interfered by the ground.

Certainly, in other embodiments of the present invention, the regulating mechanism may also be located in the wireless charging station, the wireless charging station has a movable portion receiving the wireless electric energy transmitter 21a and a base portion mounted to the ground, and the regulating mechanism is located between the movable portion and the base portion; after matching between the wireless electric energy receiver 15a and the wireless electric energy transmitter 21a is completed, the movable portion receiving the wireless electric energy transmitter 21a is lifted upwards, which may also cause the wireless electric energy receiver 15a and the wireless electric energy transmitter 21a to be closer; further, the regulating mechanism may also be connected with both the wireless electric energy receiver 15a and the wireless electric energy transmitter 21a, to control them to be close to or away from each other, which can also improve the efficiency of wireless charging.

Even, the regulating mechanism 18a is not limited to driving the wireless electric energy receiver 15a or the wireless electric energy transmitter 21a to move in the vertical direction, and may also drive the wireless electric energy receiver 15a and the wireless electric energy transmitter 21a to move in a horizontal direction, thus improving precision of matching between the wireless electric energy receiver 15a and the wireless electric energy transmitter 21a.

In this embodiment, the regulating mechanism 18a may employ multiple common transmission structures, such as worm and gear or bevel gear, and cooperate with infrared and other positioning structures to achieve rapidly and accurately driving the wireless electric energy receiver 15a and the wireless electric energy transmitter 21a to move in the vertical direction and the horizontal direction, which is a technology well known to those of ordinary skill in the art and is not repeated herein.

Figure 2:
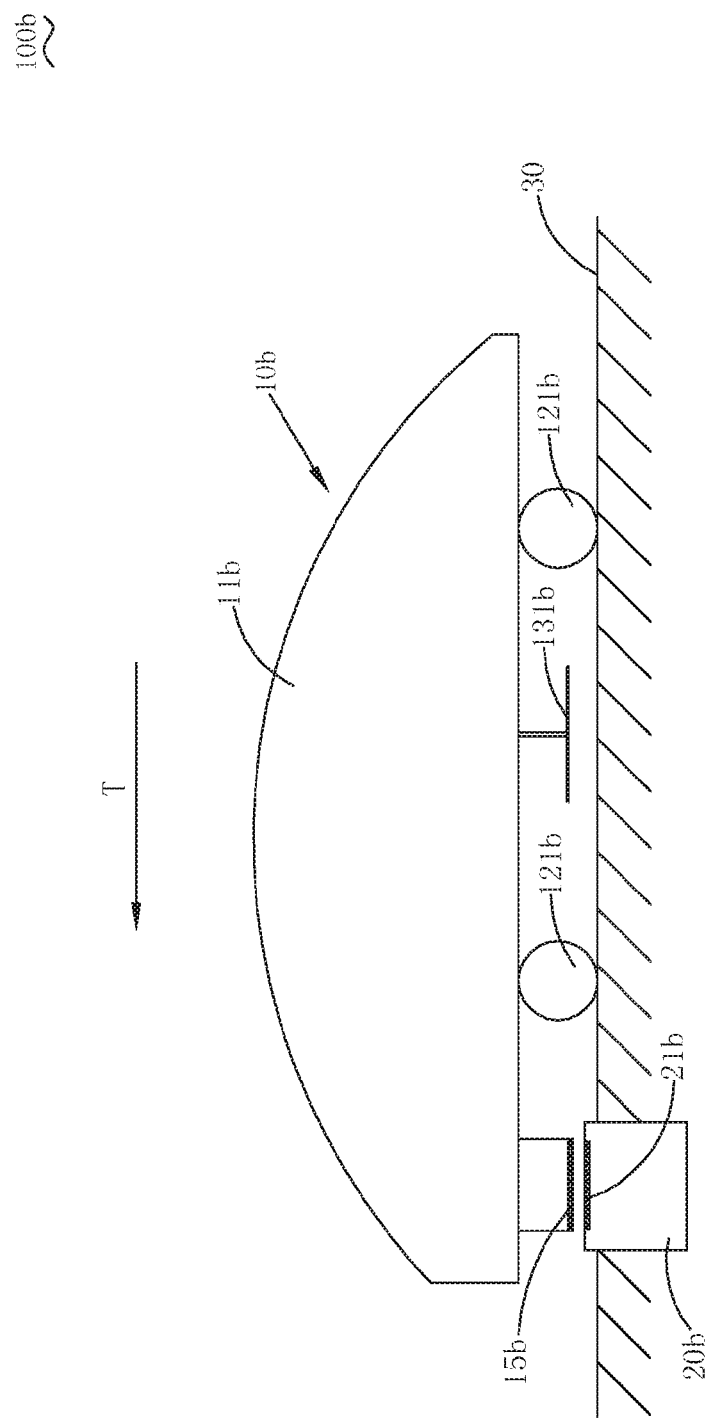
FIG. 2 is a side view of an automatic mowing system in a second embodiment of the present invention.

Referring to FIG. 2, upon comparison, the difference between the automatic mowing system 100b provided in the second embodiment of the present invention and the automatic mowing system 100a provided in the first embodiment is that: the wireless charging station 20b is only partially located below the ground of the to-be-cut region 30.

Specifically, the height of the wireless charging station 20b located above the ground of the to-be-cut region 30 is less than the minimum distance from the cutter 131b to the ground of the to-be-cut region 30. Whether the automatic mower 10a, under the driving of the mobile mechanism 121b, randomly gets close to the wireless charging station 20b or intentionally directly returns to the wireless charging station 20b for charging, the automatic mower 10b always can freely pass through or stay above the wireless charging station 20b, which facilitates alignment and matching between the wireless electric energy receiver 15b and the wireless electric energy transmitter 21b, and the cutter 131b would always not impact the wireless charging station 20b; so that the automatic mower 10b is movable to: the enclosure 11b can completely overlap with the wireless charging station 20b in the lengthwise direction T of the enclosure 11b, achieving that the to-be-cut region 30 has no cutting blind corner.

In this embodiment, by adjusting the position of the mobile mechanism 121b on the enclosure 11b, the minimum distance from the cutter 131b of the automatic mower 10b to the ground of the to-be-cut region 30 may be selected as 150 mm, 60 mm, 20 mm or other conventional heights, so that the automatic mower 10b can cut out lawns with different height in the to-be-cut region 30, thus making diversified trimming in conjunction with different varieties of grass; also, the height of the wireless charging station 20b located above the ground of the to-be-cut region 30 is also adjusted adaptively, to make it less than or equal to 150 mm, or less than or equal to 60 mm, or less than or equal to 20 mm; so that the wireless charging station 20b can adapt to the automatic mower 10b with multiple cutting heights, thereby improving adaptability of the automatic mowing system 100b.

Figure 3:
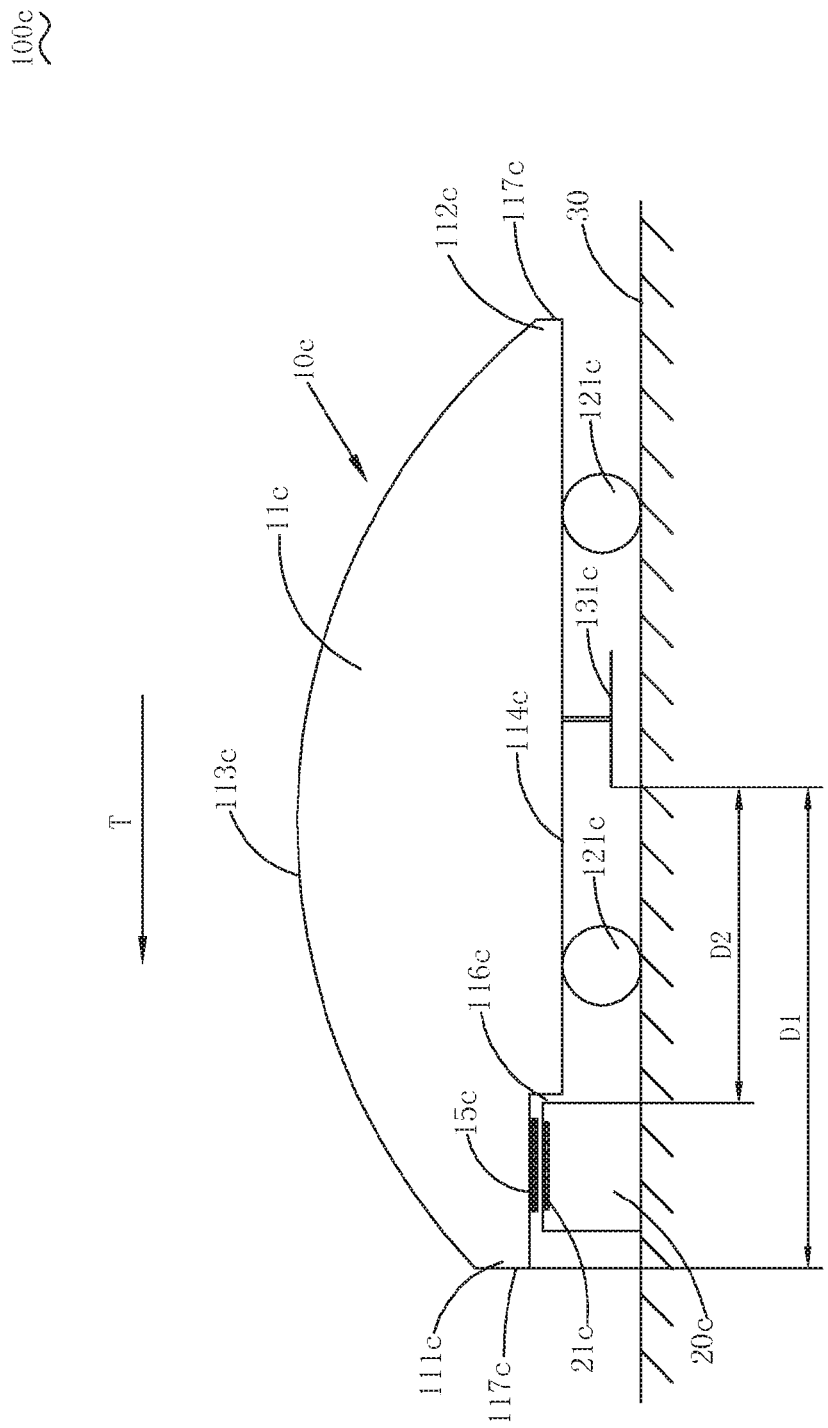
FIG. 3 is a side view of an automatic mowing system in a third embodiment of the present invention.

Referring to FIG. 3, upon comparison, the difference between the automatic mowing system 100c provided in the third embodiment of the present invention and the automatic mowing systems 100a and 100b in the first and second embodiments is that: the height of the wireless charging station 20c located above the ground of the to-be-cut region 30 is greater than the minimum distance between the cutter 131c and the ground.

Specifically, the enclosure 11c of the automatic mower 10c is provided thereon with a guide notch 116c which extends from an edge 117c of the enclosure 11c toward the inside of the enclosure 11c.

In this embodiment, the guide notch 116c is located at the head 111c of the enclosure 11c, and extends along an opposite direction of the lengthwise direction T of the enclosure 11c toward the interior of the enclosure 11c; whether the automatic mower 10c, under the driving of the mobile mechanism 121c, randomly gets close to the wireless charging station 20c or intentionally directly returns to the wireless charging station 20c for charging, at least one part of the wireless charging station 20c can be received through the guide notch 116c, so that the automatic mower 10c is movable to: the enclosure 11c and the wireless charging station 20c at least partially overlap in the lengthwise direction T of the enclosure 11c.

When the wireless charging station 20c is located in the guide notch 116c, a distance D2 between the cutter 131c and the wireless charging station 20c is apparently smaller than a distance D1 between the cutter 131c and the head 111c, which solves the deficiency that, when the height of the wireless charging station 20c located above the ground exceeds the minimum distance between the cutter 131c and the ground, a cutting blind corner in the to-be-cut region 30 is large as the head 111c of the enclosure 11c abuts against the wireless charging station 20c.

Certainly, with the increase of the distance of the guide notch 116c extending toward the interior of the enclosure 11c, the trimming capability of the automatic mower 10c may also be improved correspondingly, which is not repeated herein.

Preferably, the guide notch 116c is disposed on the bottom 114c of the enclosure 11c and extends from the bottom 114c toward the top 113c of the enclosure 11c, which facilitates the wireless charging station 20c to rapidly enter the guide notch 116c and stay below the enclosure 11c.

In other embodiments, the guide notch 116c may also be located on the tail 112c of the enclosure 11c or other parts, and is not limited to extending along an opposite direction of the lengthwise direction T into the enclosure 11c, its extending direction may be adjusted adaptively according to user demands, site conditions and the like, and it is only necessary to maintain that the guide notch 116c extends from an edge 117c of the enclosure 11c into the enclosure 11c and adaptively adjust a return movement direction of the automatic mower 10c to reverse or make other movements along the extending direction of the guide notch 116c, which is not repeated herein.

In this embodiment, the wireless electric energy receiver 15c is located in the guide notch 116c, so that the wireless electric energy receiver 15c is in communication with the periphery of the enclosure 11c, which facilitates it to match the wireless electric energy transmitter 21c staying in the guide notch 116c, thereby achieving wireless charging for the battery pack.

Certainly, the wireless electric energy receiver 15c may also be detached from the guide notch 116c through the regulating mechanism, when there is no charging demand, the wireless electric energy receiver 15c may be put away, avoiding that the wireless electric energy receiver 15c is damaged by the wireless charging station 20c, and when there is a charging demand, the wireless electric energy receiver 15c enters the guide notch 116c, to ensure the efficiency of wireless charging.

Figure 4:
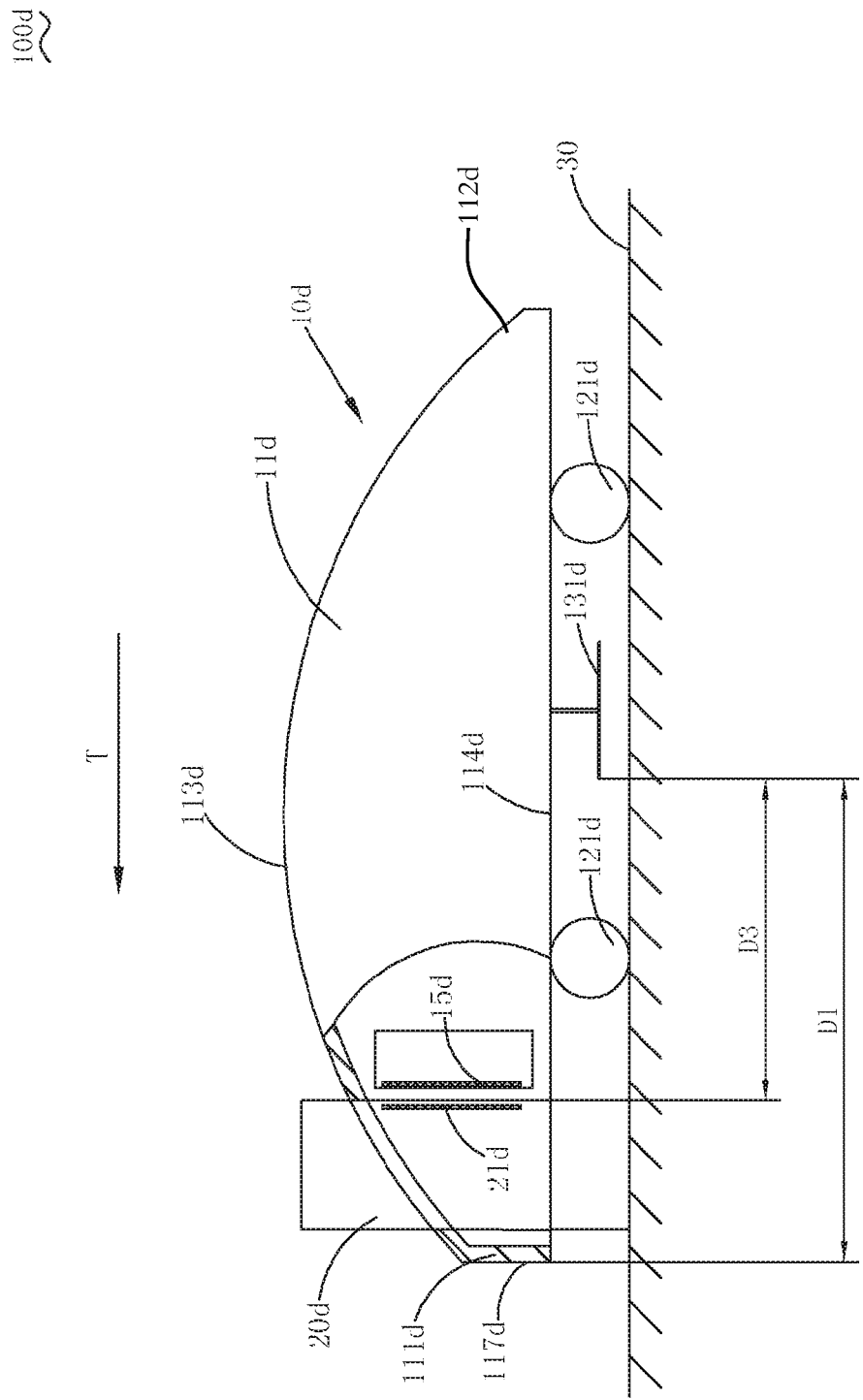
FIG. 4 is a side view of an automatic mowing system in a fourth embodiment of the present invention, wherein the head part is a section view.
Figure 5:
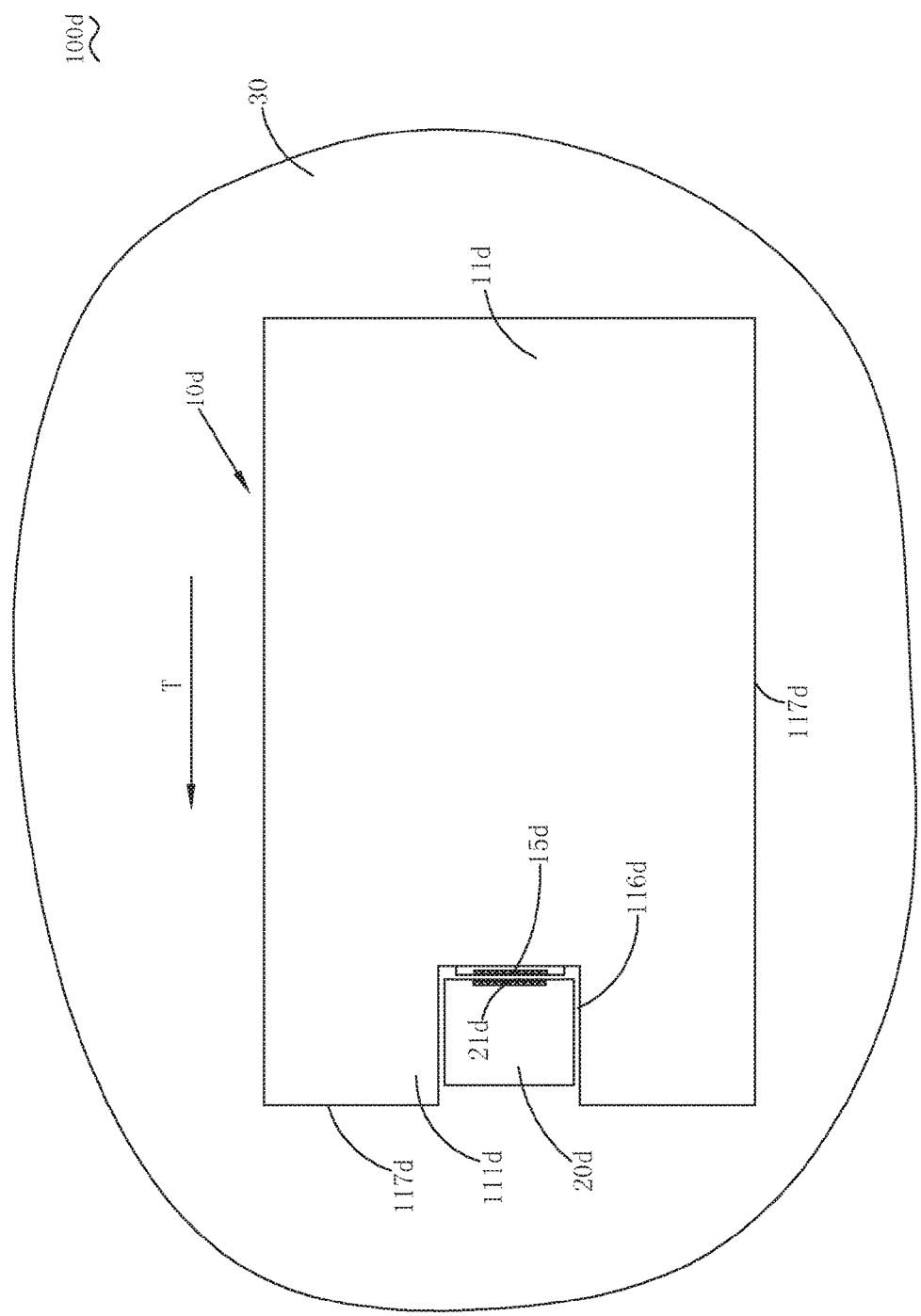
FIG. 5 is a top view of the automatic mowing system shown in FIG. 4.

Referring to FIG. 4 and FIG. 5, upon comparison, the difference between the automatic mowing system 100d provided in the fourth embodiment of the present invention and the automatic mowing system 100c in the third embodiment is that: the height of the wireless charging station 20d located above the ground of the to-be-cut region 30 is greater than the minimum distance between the cutter 131d and the ground, and higher than part of the enclosure 11d.

Specifically, the guide notch 116d is also located at the head 111d, extends from an edge 117d of the head 111d along an opposite direction of the lengthwise direction T of the enclosure 11d toward the inside of the enclosure 11d, guides the guide notch 116d to extend from the bottom 114d of the enclosure 11d to the top 113d of the enclosure 11d, and penetrates the bottom 114d and the top 113d.

Whether the automatic mower 10d, under the driving of the mobile mechanism 121d, randomly gets close to the wireless charging station 20d or intentionally directly returns to the wireless charging station 20d for charging, at least one part of the wireless charging station 20d can be received through the guide notch 116d, so that the automatic mower 10d is movable to: the enclosure 11d and the wireless charging station 20d at least partially overlap in the lengthwise direction T of the enclosure 11d.

When the wireless charging station 20d is located in the guide notch 116d, a distance D3 between the cutter 131d and the wireless charging station 20d is smaller than a distance D1 between the cutter 131d and the head 111d, which solves the deficiency that, when the height of the wireless charging station 20d exceeds the distance from the cutter 131d to the ground and part of the enclosure 11d, a cutting blind corner in the to-be-cut region 30 is large as the head 111d of the enclosure 11d abuts against the wireless charging station 20d.

The wireless electric energy receiver 15d is also located in the guide notch 116d, so that the wireless electric energy receiver 15d is in communication with the periphery of the enclosure 11d, which facilitates it to match the wireless electric energy transmitter 21d staying in the guide notch 116d, thereby achieving wireless charging for the battery pack. Compared with the prior art, the automatic mowing system provided in the present invention, by completely locating the wireless charging station below the ground, or setting the height thereof above the ground to be less than the height of the cutter relative to the ground, or setting a guide notch on the enclosure of the automatic mower and other multiple means mentioned in the foregoing embodiments, the enclosure of the automatic mower at least partially overlaps with the wireless charging station in the lengthwise direction T of the enclosure, which achieves that the automatic mower can trim the lawn closer to and even completely cover the region where the wireless charging station is, reduces and even completely removes the cutting blind corner in the to-be-cut region, ensures integrity of the lawn in the to-be-cut region, and improves the working capability of the automatic mowing system.

It should be noted therein that the cutting element performing the mowing action may be a blade or a trimming line. Correspondingly, the device transfers driving power of the cutting motor to a cutting element, which may be a cutter, a trimming head or the like. The cutter or the trimming head has the same function, that is, to transfer the driving force to the cutting element, which may be collectively referred to as a "connection tray."

Figure 6:
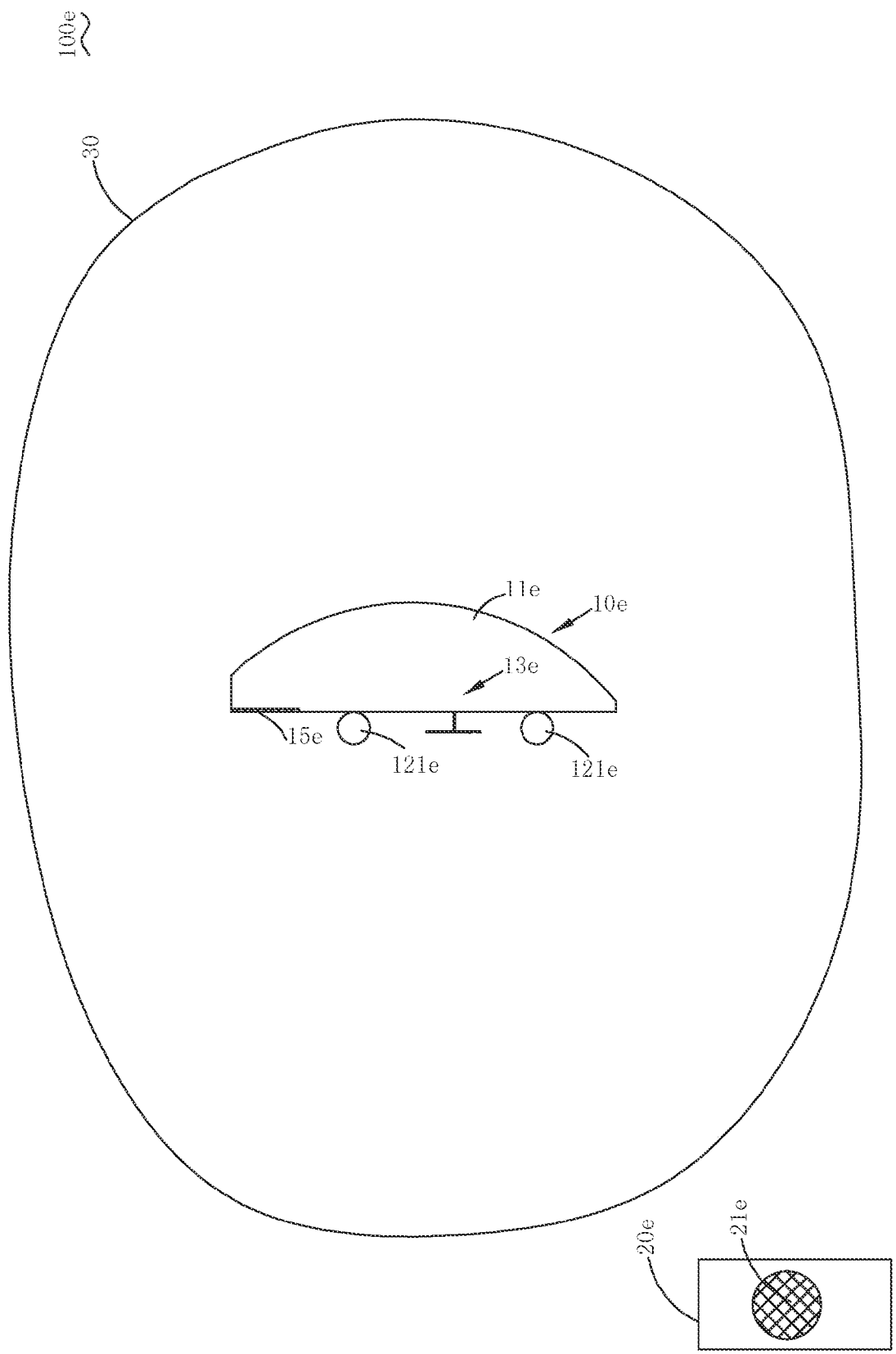
FIG. 6 is a top view of an automatic mowing system in a fifth embodiment of the present invention.

Referring to FIG. 6, upon comparison, the difference between the automatic mowing system 100e provided in the fifth embodiment of the present invention and the automatic mowing system 100a provided in the first embodiment is that: the wireless charging station 20e is located in a region outside the to-be-cut region 30. Although the region is not the to-be-cut region 30, it belongs to a region within a movable range of the automatic mower 10e. Those skilled in the art may understand that the wireless charging station 20e may be partially or wholly located in the region within a movable range of the automatic mower 10e. In a situation that the top of the wireless charging station 20e is lower than the bottom of the cutting device 13e, the automatic mower 10e always can freely pass through or stay above the wireless charging station 20e, and the cutting device 13e would not impact the wireless charging station 20e; so that the automatic mower 10e is movable to: the enclosure 11e can completely overlap with the wireless charging station 20e in the lengthwise direction T of the enclosure 11e, achieving that the automatic mower 10e has no cutting blind corner in the movable range and ensuring integrity and beauty of the lawn in the movement range of the automatic mower 10e. That the wireless charging station 20e is lower than the cutting device 13e includes, but is not limited to, the following situations: 1) the wireless charging station 20e is wholly located in a position below the ground, the height of the top thereof coming out of the ground is zero, the height apparently from the ground is a negative value, while the height of the bottom of the cutting device 13e to the ground is a positive value; therefore, the wireless charging station 20e is lower than the cutting device; 2) the wireless charging station 20e is at least partially located above the ground, that is, the height of the top of the wireless charging station 20e to the ground is a positive value, but the height value is lower than that of the bottom of the cutting device 13e to the ground; 3) the wireless charging station 20e is completely located above the ground, and the height value of the top of the wireless charging station 20e relative to the ground is lower than the height value of the bottom of the cutting device 13e to the ground.

When the wireless charging station 20e is completely located below the ground, the wireless electric energy transmitter 21e is located below the ground. When the wireless charging station 20e is partially located above the ground, the wireless electric energy transmitter 21e may be located below the ground, and may also be at least partially located above the ground. When the wireless charging station 20e is completely located above the ground, the wireless electric energy transmitter 21e is completely located above the ground.

Figure 7:
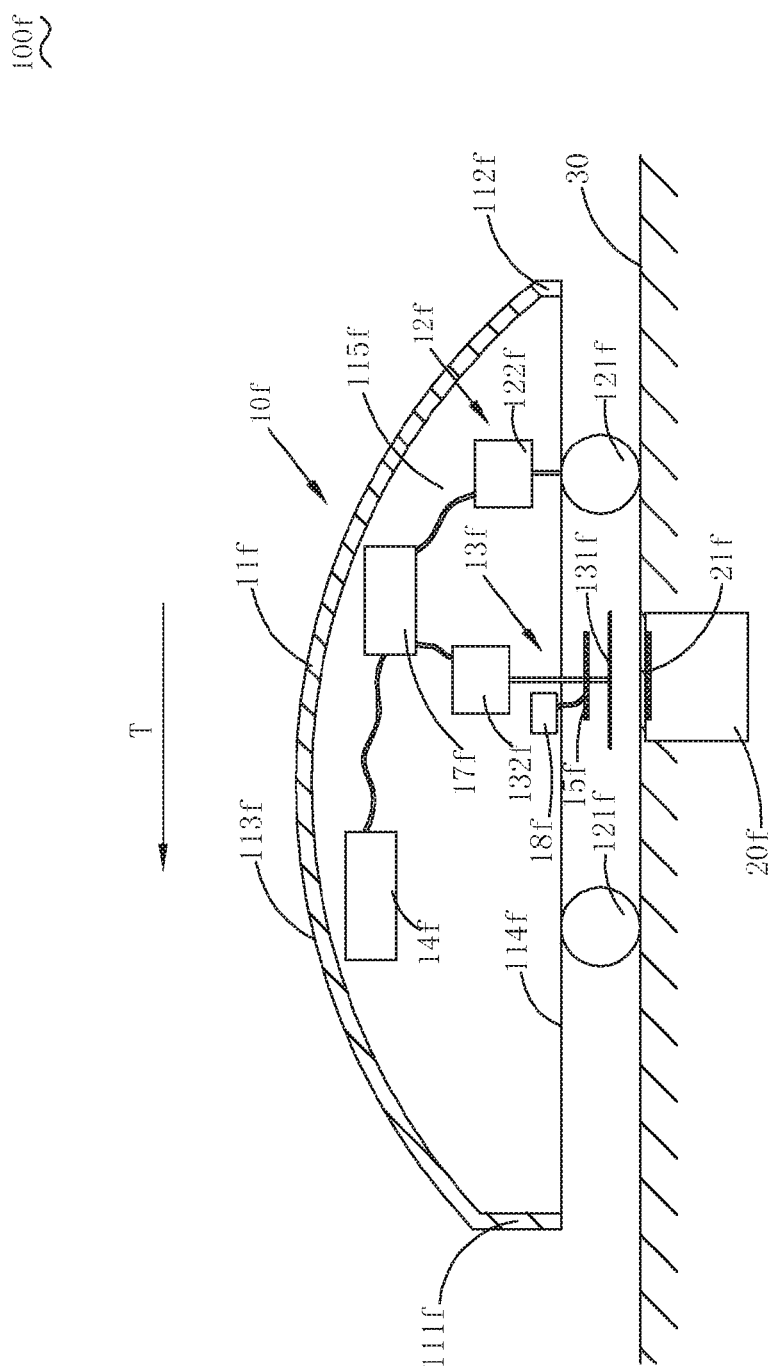
FIG. 7 is a sectional view of an automatic mowing system in a sixth embodiment of the present invention.

Referring to FIG. 7, upon comparison, the difference between the automatic mowing system 100f provided in a sixth embodiment of the present invention and the automatic mowing system 100a provided in the first embodiment is that: the cutting device 13f includes a cutting element that performs a mowing action, and a connection tray 131f that transfers driving power from the cutting motor 132f to the cutting element. The cutting element may be a trimming line, a cutting blade or the like. Correspondingly, the connection tray 131f may be a trimming head or a cutter. The wireless electric energy receiver 15f is disposed above the connection tray 131f.

Figure 8:
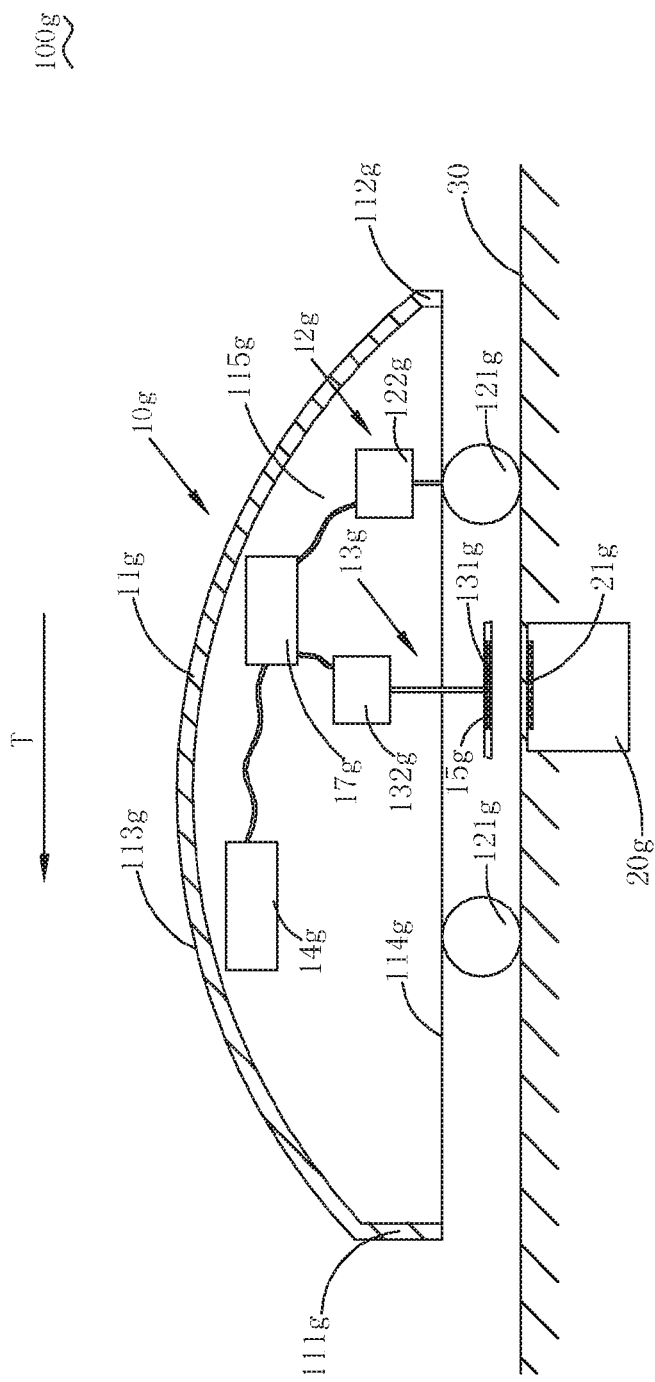
FIG. 8 is a sectional view of an automatic mowing system in a seventh embodiment of the present invention.

Referring to FIG. 8, upon comparison, the difference between the automatic mowing system 100g provided in the seventh embodiment of the present invention and the automatic mowing system 100a provided in the first embodiment is that: the cutting device 13g includes a cutting element that performs a mowing action, and a connection tray 131g that transfers driving power from the cutting motor 132g to the cutting element. The wireless electric energy receiver 15g is disposed in the connection tray 131g. The structure causes the space utilization rate to be the highest. The cutting element may be a blade or a trimming line. Correspondingly, the connection tray 131g may be a trimming head or a cutter.

Figure 9:
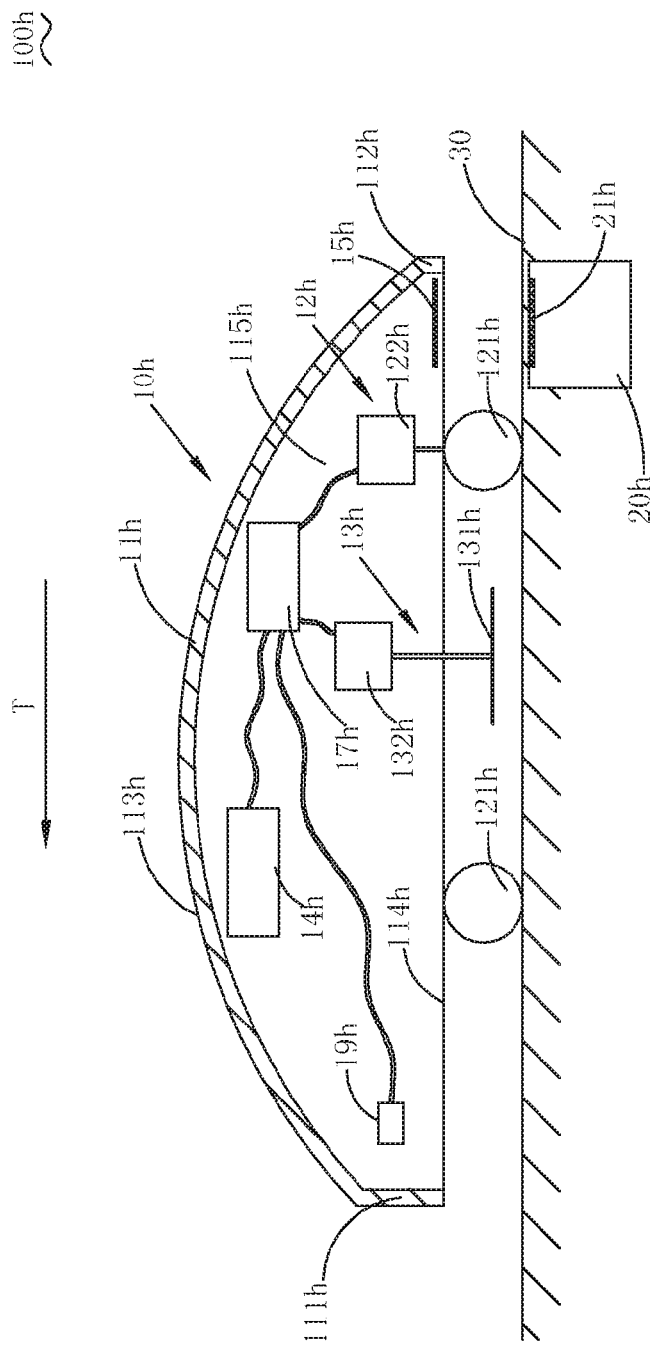
FIG. 9 is a sectional view of an automatic mowing system in an eighth embodiment of the present invention.

Referring to FIG. 9, upon comparison, the difference between the automatic mowing system 100h provided in the eighth embodiment of the present invention and the automatic mowing system 100a provided in the first embodiment is that: the automatic mower 10h further includes a boundary sensor 19h. The boundary sensor 19h receives information representing the boundary of the to-be-cut region 30, so as to identify the position of the automatic mower 10h relative to the boundary of the to-be-cut region 30. The wireless electric energy receiver 15h is separated from the boundary sensor 19h, so that the automatic mower 10h has sufficient space to dispose the boundary sensor 19h and the wireless electric energy receiver 15h. In the implementation, the cutting device 13h includes a cutting element that performs a mowing action, and a connection tray 131h that transfers driving power from the cutting motor 132h to the cutting element. The cutting device may be a trimming rope or a cutting blade. Correspondingly, the connection tray 131h may be a trimming head or a cutter.

For the boundary sensor 19h, in a preferred embodiment, the automatic mowing system 100h further includes a boundary device that delimits the to-be-cut region 30 of the automatic mowing system 100h, and the boundary device sends a boundary signal. The boundary sensor 19h identifies the position relative to the boundary of the to-be-cut region 30 by receiving a boundary signal. In other preferred embodiments, the boundary sensor 19h includes a video pickup device, which judges the position of the automatic mowing system 100h relative to the boundary of the to-be-cut region 30 by picking up image information of surrounding environments of the automatic mowing system 100h.

For the setting positions of the boundary sensor 19h and the wireless electric energy receiver 15h, in the eighth embodiment as shown in FIG. 9, the boundary sensor 19h and the wireless electric energy receiver 15h are disposed at a front portion and a rear portion along the lengthwise direction T of the enclosure 11h, respectively.

Figure 10:
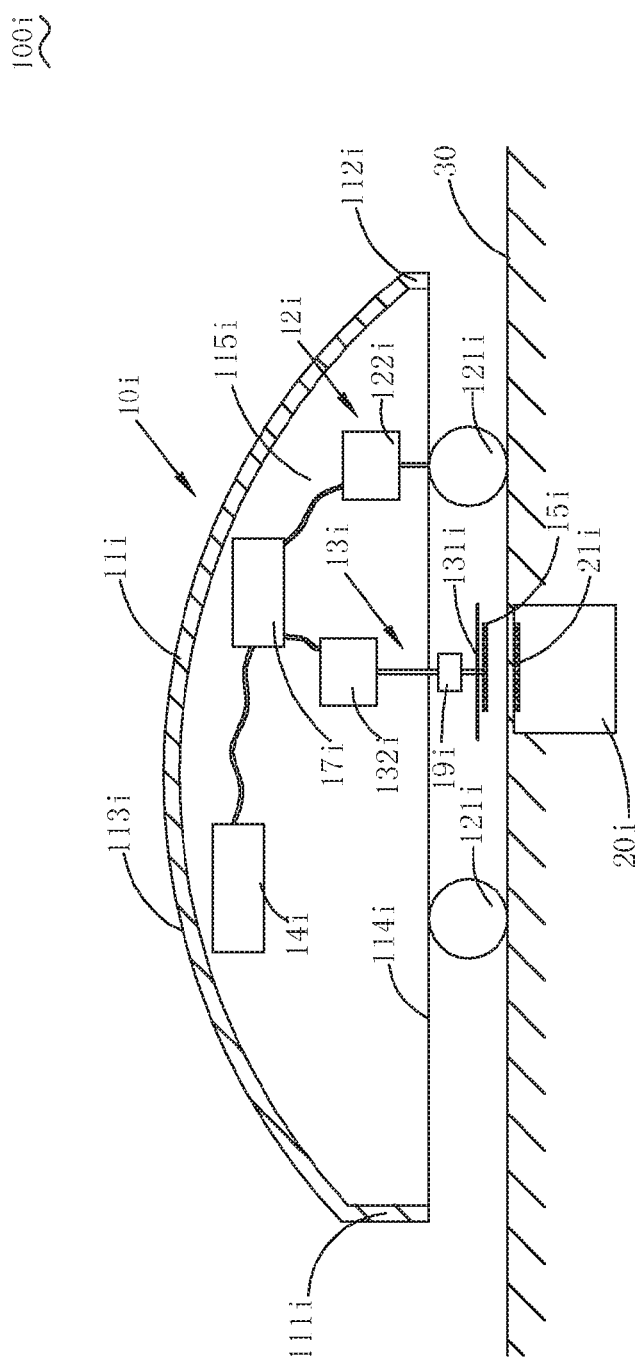
FIG. 10 is a sectional view of an automatic mowing system in a ninth embodiment of the present invention.

The difference between the ninth embodiment, as shown in FIG. 10, and the eighth embodiment, as shown in FIG. 9, lies in that one of the boundary sensor 19i and the wireless electric energy receiver 15i is disposed above the connection tray 131i. Meanwhile, the other one of the boundary sensor 19i and the wireless electric energy receiver 15i is disposed below the connection tray 131*i*. Preferably, the boundary sensor 19*i* is disposed above the connection tray 131*i*, and the wireless electric energy receiver 15*i* is disposed below the connection tray 131*i*. Those skilled in the art can understand that, in other implementations, the boundary sensor and the wireless electric energy receiver may be disposed at a front portion and a rear portion along a travel direction of the automatic mower, respectively. The travel direction of the automatic mower may be the same as or different from the lengthwise direction T of the enclosure.

In the present invention, above the connection tray may be any position on a space extending upwards from the top of the connection tray along a vertical direction to an outer surface of the enclosure. Below the connection tray may be any position on a space extending downwards from the bottom of the connection tray along the vertical direction to ground.

In the fifth to ninth embodiments, the height from the top of the wireless charging station to the ground is lower than the height from the bottom of the cutting device to the ground. Those skilled in the art can understand that the fifth to ninth embodiments may be improved as follows: the height of the top of the wireless charging station located above the ground is greater than the minimum distance between the cutting device and the ground. At this point, to reduce the cutting blind corner of the automatic mower in the movement range, reference can be made to the third embodiment of the present invention for the specific structure of the automatic mowing system. Those skilled in the art can understand that the fifth to ninth embodiments may also be improved as follows: the height of the wireless charging station located in the movement range of the automatic mower is higher than part of the enclosure while greater than the minimum distance between the cutting device and the ground. At this point, to reduce the cutting blind corner of the automatic mower in the movement range, reference can be made to the fourth embodiment of the present invention for the specific structure of the automatic mowing system.

In the foregoing embodiments, the size of the wireless electric energy receiver along the width direction of the automatic mower is less than or equal to 50 cm, and such a width enables the wireless electric energy receiver to be completely received in the enclosure. The size may also be 40 cm, 30 cm, 20 cm, 10 cm or any other sizes, and the specific size is set according to the demand for charging power. Preferably, the wireless electric energy receiver is a round disc. At this point, the diameter of the wireless electric energy receiver is less than or equal to 50 cm. The diameter may also be 40 cm, 30 cm, 20 cm, 10 cm or any other sizes, and the specific size is set according to the demand for charging power. The battery pack may also be other energy storage devices such as a super-capacitor. The energy storage devices and the battery pack may be collectively referred to as "energy storage unit."

It should be understood that, although the specification is described according to the embodiments, not each embodiment only includes an independent technical solution, such a descriptive manner of the specification is merely for the sake of clarity, those skilled in the art should take the specification as a whole, and the technical solutions in the embodiments may also be properly combined to form other embodiments that can be understood by those skilled in the art.

A series of detailed descriptions listed above are merely specific description about feasible embodiments of the present invention, they are not used to limit the protection scope of the present invention, and any equivalent embodiment or change without departing from the technical spirit of the present invention should be included in the scope of the present invention.

What is claimed is:

1. A mowing system, comprising:
   an automatic mower, comprising:
      an enclosure, comprising a head and a tail;
      an energy storage unit fixed in the enclosure;
      a mounting portion connected to the enclosure and located close to the head;
      a wireless electric energy receiver mounted in the mounting portion and located close to an outer surface of the mounting portion, the wireless electric energy receiver electrically connected with the energy storage unit;
      a regulating mechanism fixed in the enclosure and connected to the mounting portion, the regulating mechanism configured to drive the mounting portion to change a position of the wireless electric energy receiver relative to the enclosure;
      a boundary sensor configured to receive a signal representing a boundary of a to-be-cut region and to identify a position of the automatic mower relative to the boundary of the to-be-cut region, the boundary sensor separated from the wireless electric energy receiver and located close to the tail;
      a control circuit electrically connected with the regulating mechanism; and
      a cutting device configured to operate while the automatic mower is in the to-be-cut region defined by the boundary; and
   a wireless charging station buried in a ground and offset from the ground surface, the wireless charging station comprising:
      a wireless electric energy transmitter configured to charge the automatic mower responsive to an intentional return of the automatic mower to the wireless charging station for charging;
   wherein the regulating mechanism is controlled by the control circuit to drive, responsive to a matching between the wireless electric energy receiver and the wireless electric energy transmitter, the wireless electric energy receiver to move along a vertical direction toward the wireless electric energy transmitter to cling to the ground to charge the wireless electric energy receiver.

2. The mowing system according to claim 1, wherein the wireless charging station is configured to be positioned completely within a movement range of the automatic mower.

3. A mowing system comprising:
   an automatic mower, comprising:
      an enclosure comprising a head and a tail;
      an energy storage unit fixed in the enclosure;
      a mounting portion connected to the enclosure and located close to the head;
      a wireless electric energy receiver mounted in the mounting portion and located close to an outer surface of the mounting portion, the wireless electric energy receiver electrically connected with the energy storage unit;
      a regulating mechanism fixed in the enclosure and connected to the mounting portion, the regulating mechanism configured to drive the mounting portion to change a position of the wireless electric energy receiver relative to the enclosure;

a control circuit electrically connected with the regulating mechanism; and
a cutting device configured to operate while the automatic mower is in a region defined by a boundary; and
a wireless charging station buried in a ground and offset from a ground surface, the wireless charging station comprising:
a wireless electric energy transmitter configured to charge the automatic mower responsive to an intentional return of the automatic mower to the wireless charging station for charging;
wherein the regulating mechanism is controlled by the control circuit to drive, responsive to a matching between the wireless electric energy receiver and the wireless electric energy transmitter, the wireless electric energy receiver to move along a vertical direction toward the wireless electric energy transmitter to cling to the ground to charge the wireless electric energy receiver.

4. The mowing system of claim 3, wherein the wireless charging station is configured to be positioned at least partially in a movement range of the automatic mower but outside of a to-be-cut region.

5. A mowing system comprising:
an automatic mower comprising:
an enclosure;
an energy storage unit fixed in the enclosure;
a wireless electric energy receiver electrically connected with the energy storage unit;
a cutter plate configured to operate while the automatic mower is in a to-be-cut region, the wireless electric energy receiver fixed to the cutter plate; and
a wireless charging station buried in a ground and offset from the ground surface, the wireless charging station comprising:
a wireless electric energy transmitter configured to charge the automatic mower responsive to an intentional return of the automatic mower to the wireless charging station for charging;
wherein responsive to a matching between the wireless electric energy receiver and the wireless electric energy transmitter the wireless electric energy receiver moves along a vertical direction toward the wireless electric energy transmitter to cling to the ground to charge the wireless electric energy receiver.

6. The mowing system according to claim 5, wherein the wireless charging station is configured to be positioned completely in the movement range of the automatic mower.

7. A mowing system comprising:
an automatic mower comprising:
an energy storage unit;
a wireless electric energy receiver electrically connected with the energy storage unit;
a regulating mechanism configured to drive the wireless electric energy receiver to move;
a control circuit electrically connected with the regulating mechanism; and
a cutting device comprising a cutting element and a connection tray, the connection tray configured to transfer driving power from a motor to the cutting element; and
a wireless charging station buried in a ground and offset from a ground surface, the wireless charging station comprising:
a wireless electric energy transmitter, the wireless charging station configured to be positioned at least partially in a movement range of the automatic mower, the wireless charging station further configured to charge the automatic mower responsive to an intentional return of the automatic mower to the wireless charging station for charging;
wherein the regulating mechanism is controlled by the control circuit to drive, responsive to a matching between the wireless electric energy receiver and the wireless electric energy transmitter, the wireless electric energy receiver to move along a vertical direction toward the wireless electric energy transmitter to cling to the ground to charge the wireless electric energy receiver.

8. The automatic mowing system according to claim 7, wherein the automatic mower further comprises a boundary sensor, the boundary sensor configured to receive a signal representing a boundary of a to-be-cut region and to identify a position of the automatic mower relative to the boundary of the to-be-cut region.

9. The automatic mowing system according to claim 8, wherein the boundary sensor and the wireless electric energy receiver are disposed at a front portion and a rear portion along a travel direction of the automatic mower, respectively.

10. The automatic mowing system according to claim 8, wherein the boundary sensor is disposed above the connection tray.

11. The mowing system of claim 8, wherein:
the boundary sensor is disposed above the connection tray; and
the wireless electric energy receiver is disposed below the connection tray.

12. An automatic mowing system, wherein the automatic mowing system comprises:
an automatic mower comprising:
an enclosure;
an energy storage unit fixed in the enclosure;
a cutting device comprising a cutting element and a connection tray, the connection tray configured to transfer driving power from a motor to the cutting element;
an energy storage unit configured to provide power for the cutting device;
a wireless electric energy receiver electrically connected with the energy storage unit, the wireless electric energy receiver disposed below the connection tray;
a regulating mechanism configured to change a position of the wireless electric energy receiver; and
a boundary sensor configured to receive a signal representing a boundary of a to-be-cut region and to identify a position of the automatic mower relative to the boundary of the to-be-cut region, the boundary sensor separated from the wireless electric energy receiver and located above the connection tray; and
a wireless charging station comprising:
a wireless electric energy transmitter configured to selectively match the wireless electric energy receiver to charge the energy storage unit;
wherein the wireless electric energy receiver is configured to move along a vertical direction towards the wireless electric energy transmitter.

13. The automatic mowing system according to claim 12, wherein a size of the wireless electric energy receiver along a width direction of the automatic mower is less than or equal to 50 cm.

14. The mowing system of claim 12, wherein the wireless charging station is further configured to be positioned below a ground.

\* \* \* \* \*